UNITED STATES PATENT OFFICE.

JOHN DALE, OF MANCHESTER, ENGLAND.

IMPROVEMENT IN THE MANUFACTURE OF PIGMENTS.

Specification forming part of Letters Patent No. 57,264, dated August 14, 1866.

*To all whom it may concern:*

Be it known that I, JOHN DALE, of Manchester, in the county of Lancaster, Great Britain, have invented improvements in the production of substances to be used in place of the pigment usually termed "satin-white;" and I do hereby declare that the following is a full and exact description thereof.

My invention consists, first, in decomposing the material called "satin-white," containing sulphate of lime and alumina, by chloride of barium or strontium, so as to replace, or partially so, the sulphate of lime by the sulphate of baryta or strontia; secondly, in the production of a material to be used in place of satin-white by using caustic baryta or strontia instead of lime, as in the ordinary method of making satin-white.

In carrying my invention into practice I proceed as follows: First, when I wish to replace the sulphate of lime in the ordinary satin-white, (that manufactured from lime and sulphate of alumina,) I diffuse the ordinary finished satin-white through water, and add to it a solution of chloride of barium until the whole or part of the contained sulphate of lime shall have been converted into sulphate of baryta.

The proportions to be used may be varied according to the amount of sulphate of lime to be replaced. In practice I find five hundred-weight of chloride of barium to be sufficient for one ton of ordinary satin-white.

The supernatant chloride of calcium is removed by washing, and the resulting precipitate is pressed, and is then in a fit state for use.

When I wish to manufacture the satin-white by the use of caustic baryta or strontia in the place of lime, I take four equivalents of caustic baryta or strontia and add it to one equivalent of potash or ammonia, alum, or tersulphate of alumina. The mixture with moisture, as in making satin-white, is effected in a pug-mill until the decomposition is complete. The product is then withdrawn from the mill, washed and pressed, and is ready for use.

If a mixture should be desired to be made, a certain amount of caustic baryta may be replaced by the addition of an equivalent quantity of caustic lime or strontia.

Having thus described and ascertained the nature of my said invention and the manner in which the same is to be performed, I desire it to be understood that I claim—

1. The production of a pigment by decomposing the known pigment satin-white by means of chloride of barium or strontium, so as to replace, or partially replace, sulphate of lime by sulphate of barium or strontium.

2. The production of a pigment by using caustic baryta or strontia instead of or partly instead of the lime ordinarily used in making satin-white.

JOHN DALE.

Witnesses:
 WM. TUDA MABLY,
 W. T. CHEETHAM,
*Both of* 14 *St. Ann's Square, Manchester.*